United States Patent Office 3,543,534
Patented Dec. 1, 1970

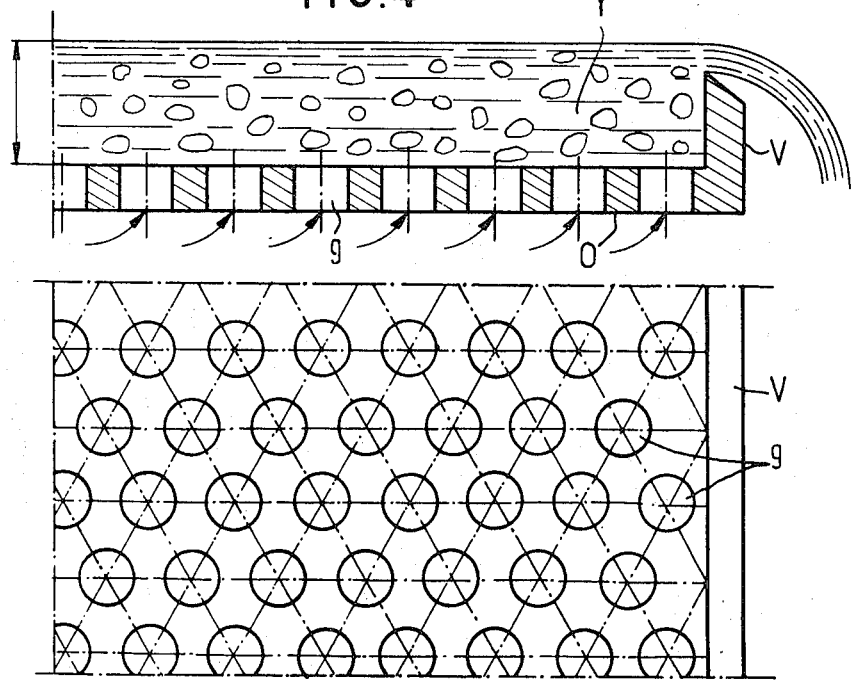
FIG. 4
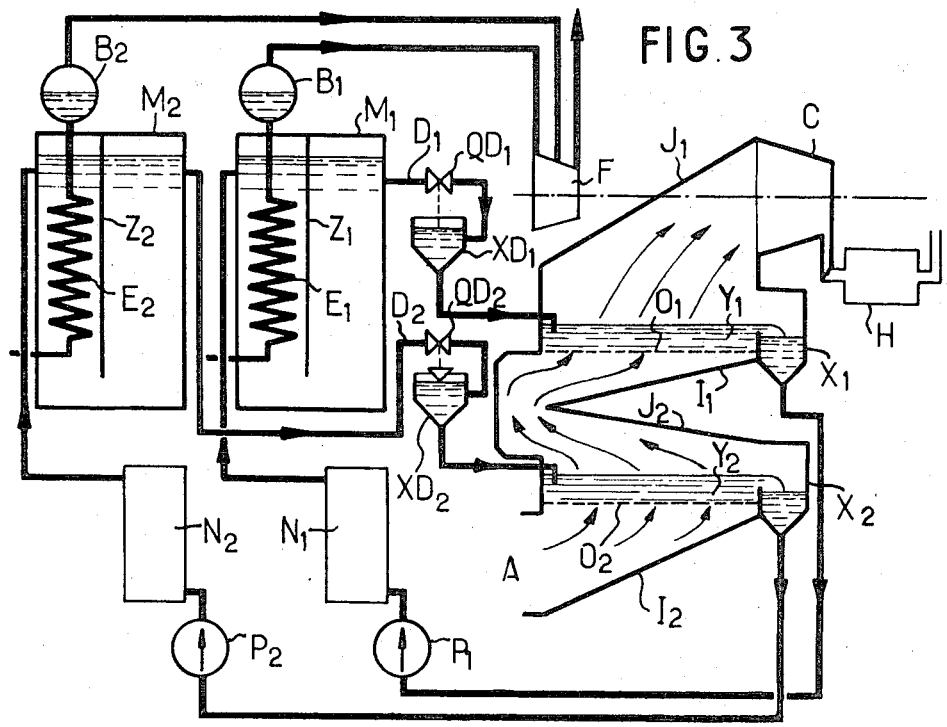
FIG. 5
FIG. 3

3,543,534
APPARATUS FOR GENERATION OF ENERGY
IN A GAS CYCLE
Pierre Henri Pacault, Ville d'Avray, and Francis J. Mary,
Paris, France, assignors to Babcock-Atlantique Societe
Anonyme, Paris, France, a corporation of France
Filed Jan. 3, 1969, Ser. No. 788,887
Claims priority, application France, Jan. 12, 1968,
135,738
Int. Cl. F28d 5/00
U.S. Cl. 62—310          13 Claims

ABSTRACT OF THE DISCLOSURE

Apparatus for generation of energy in a gas cycle has in addition to the conventional elements of a turbine, compressor and heat source, a refrigerating machine for cooling the working fluid prior to its infeed into the compressor therefor and having a compressor for cold-producing fluid. Also provided is a network for circulation of intermediary fluid and means for performing a heat exchange between the intermediary fluid and the cold-producing fluid on the one hand and between the intermediary fluid and the working fluid on the other hand. This latter heat exchange is performed by direct contact between the fluids, one of the fluids passing through the other fluid.

BACKGROUND OF THE INVENTION

The present invention relates to apparatus for generation of energy in a gas cycle of the kind which employs the process described in U.S. patent application Ser. No. 788,748, filed in the applicants' name for "Generation of Energy in a Gas Cycle."

SUMMARY

According to the invention apparatus for generation of energy in a gas cycle comprises in addition to the conventional elements, consisting of a turbine, compressor for the working fluid and heat source, a refrigerating machine for cooling the working fluid prior to its infeed into the compressor therefor, and having a compressor for cold-producing fluid, a network for circulation of intermediary fluid, and means for performing a heat exchange between the intermediary fluid and the cold-producing fluid on the one hand and between the intermediary fluid on the other hand.

The arrangements of this invention apply in general manner to open or closed gas cycles, but some of them are more appropriate for open cycles employing air drawn continually from the atmosphere as a working fluid.

According to one of these arrangements, the heat transfer between the working fluid and the cold-producing fluid is performed by means of a fluid which cannot freeze at the temperatures of operation.

The heat transfer between the air and the intermediary fluid preferably occurs by direct contact, which has the result of freeing the air of its impurities and of practically eliminating the temperature gradient between the two fluids at the point of egress of the cooled fluid. Moreover, the elimination of the layer of an exchanger surface between the two fluids eliminates the dangers of icing.

According to one application of this transfer method by direct contact, instead of injecting into the air a shower of atomised intermediary fluid, a sheet of intermediary fluid flowing horizontally is caused to be traversed upwards from below by the air. This has the result of reducing the size of the apparatus and of attenuating the noise coming from the intake of the compressor.

The arrangements described above are easily adaptable to a refrigerating machine of the special type described in the aforesaid patent application and comprising several stages for decompression, vapourisation and compression of the cold-producing fluid.

According to one form of the invention several horizontal sheets of intermediary fluid are arranged one above another and traversed in series by the air which is to be cooled.

BRIEF DESCRIPTION OF THE DRAWINGS

FIG. 3 illustrates a similar embodiment to that of FIG. 2, but adapted to a refrigerating machine possessing several stages;

FIG. 4 is a partial detail view in vertical section of the horizontal sheet of intermediary fluid employed in the embodiment of FIG. 2; and FIG. 5 is a plan view of the detail shown in FIG. 4.

DESCRIPTION OF THE PREFERRED EMBODIMENTS

Figure 1:
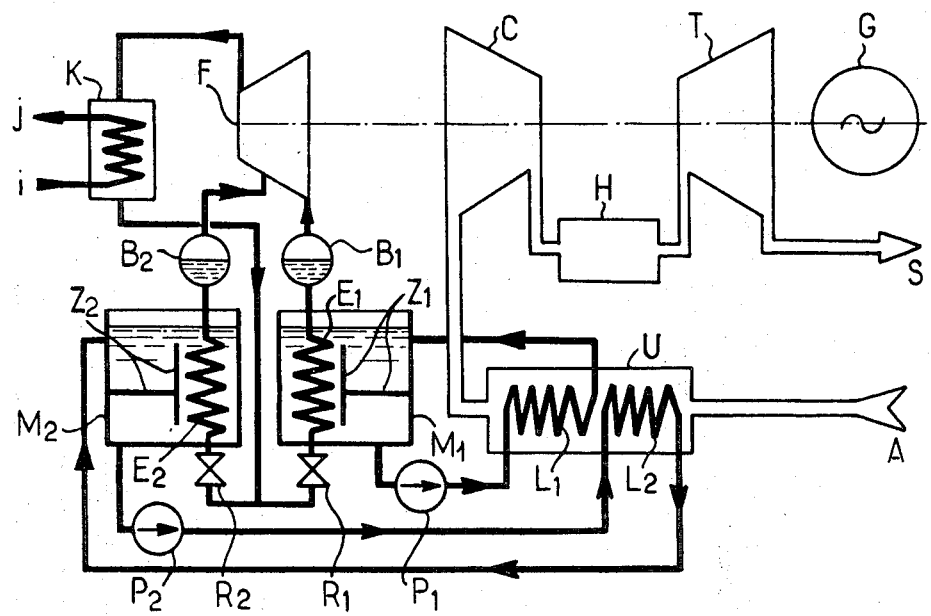
FIG. 1 by way of example is a diagram illustrating a form of embodiment of the invention.

With reference to FIG. 1, power generation apparatus has a gas turbine T driving a load G, a combustion chamber H and a compressor C compressing air drawn in at A and flowing in a casing U.

The compressor F of a refrigerating machine compresses a cold-producing fluid which is cooled and condensed in a convection exchanger K comprising a nest of tubes with water inflow and outflow at $i$ and $j$ respectively; the cold-producing fluid condensed is depressurised in parallel through the valves R1, R2, is vapourised in the corresponding nests of tubes E1, E2, and is separated into two liquid and vapour phases in the vessels B1, B2, the vapour in these two vessels being drawn into two corresponding intake stages of the compressor F according to the mode of operation described in the aforesaid patent application.

In the present case, however, the air to be cooled and traversing the casing U, does not sweep over the nests E1, E2 of cold-producing fluid, but over two corresponding nests L1, L2 in which a brine cooled by the cold producing fluid of the nests E1, E2 flows as an intermediary fluid. To this end, the nest E1 is immersed into a brine tank M1 which, in a closed circuit, feeds the tubular nest L1 by means of a pump P1. A set of baffles or the like Z1 arranged within the tank M1 forces the brine flowing therein to sweep over the nest E1 before returning to the nest L1. Analogous elements M2, P2 and Z2 are incorporated for the nests E2 and L2.

Figure 2:
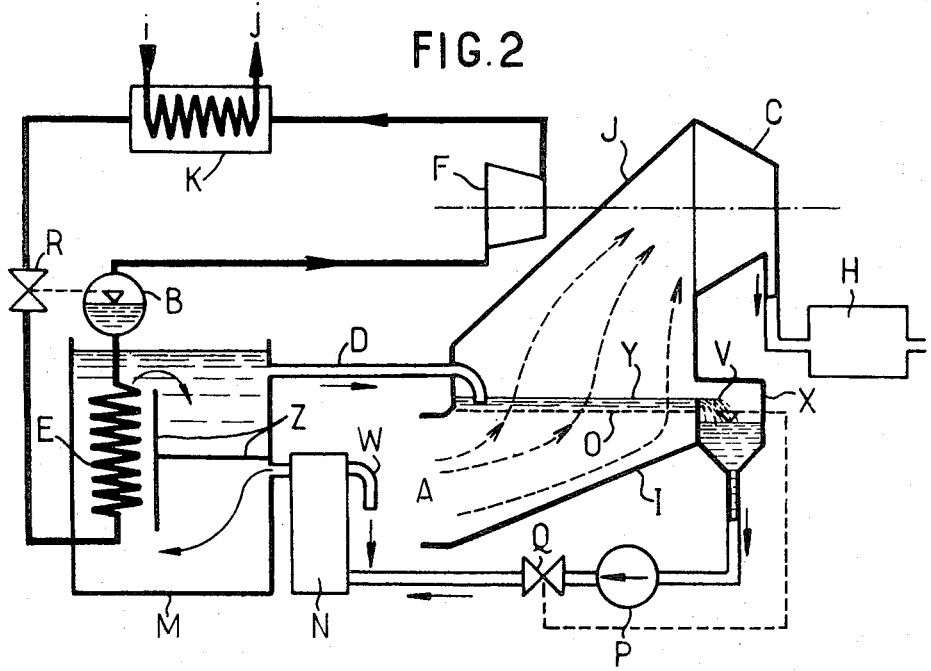
FIG. 2 illustrates another embodiment, heat exchange between the intermediary fluid and the working fluid being performed by direct contact.

In the embodiment illustrated in FIG. 2, the heat exchange between the air and the brine occurs by direct contact with the result of reducing the temperature difference between these two fluids, and of reducing the same practically to naught at the cold air outlet. The apparatus of FIG. 2 comprises the same elements C, H, T, G as described above with regard to FIG. 1. These elements are provided in combination with a single-stage refrigerating machine comprising a compressor F, a cooler-condenser K, release valve R, evaporator nest of tubes E and separating flask B, the flask B returning vapourised cold-producing fluid to the compressor F.

The nest E is immersed in a brine tank M equipped with baffles Z. The tank supplies, through a pipe D, a liquid sheet Y located above a perforated plate O having a peripheral rim. One side of this rim forms an overflow V and controls the thickness of the sheet Y. The plate O possessing perforations g is illustrated to enlarged scale, in vertical section and in plan view, in the partial views of FIGS. 4 and 5.

The brine flowing over the overflow V collects in a vessel X and returns to the tank M under the action of a pump P. A constricting valve Q installed in the return pipe and linked to the level of brine in the vessel X, renders it possible to keep this level at a constant height, to prevent swamping of the "threshold" of the overflow V, as well as the danger of cavitation to the pump P. The return of the brine to the tank M occurs through an automatically cleaned filter N intended to arrest the impurities left behind by the air traversing the sheet of brine Y. These impurities are evacuated by the effluent W, and the filtered brine is recycled to the tank, in which it is cooled against whilst sweeping over the evaporator E of the refrigerating machine.

A chamber I, equipped with an opening A and forming a divergent air intake, is arranged below the perforated plate O to which it is joined in sealed manner. A cowling J installed on the plate O and the vessel X encloses a space above the sheet of brine, in communication with the intake of the compressor C. During operation, the air drawn in at A rises into the divergent section I, passes through the perforated plate O and the sheet of brine Y and is ducted to the compressor C by the cowling J.

FIG. 3 relates to a plant employing air cooling by direct contact, with a refrigerating machine having two vapourising stages, comprising two evaporator nests E1, E2 immersed in two corresponding brine tanks M1, M2 which supply two sheets of brine Y1, Y2 by means of two separated closed circuits. Each of these circuits comprises the same elements as those of the apparatus shown in FIG. 2, which elements are marked by the same references but qualified by the index 1 or 2.

The sheets of brine Y1, Y2 are situated one above another. The air to be cooled passes consecutively through the sheets Y2 and Y1 before reaching the compressor C, the cowling J2 of the lower sheet Y2 being in communication with the divergent section I1 of the upper sheet Y1. The outlet pipes D1, D2 of the tanks M1, M2 feed the sheets Y1, Y2 through vessels XD1, XD2 and constricting valves QD1, QD2 linked to the liquid levels in the said vessels. It is thus possible to arrange the sheets Y1, Y2 one above the other, whilst keeping the brine tanks M1, M2 at the same level.

We claim:

1. Apparatus for producing mechanical power, comprising a gas turbine including a compressor for working fluid, a refrigerating machine for cooling the working fluid prior to its infeed into the compressor therefor, and having a compressor for cold-producing fluid, a network for circulation of intermediary fluid, and means for performing a heat exchange between the intermediary fluid and the cold-producing fluid on the one hand and between the intermediary fluid and the working fluid on the other hand.

2. Apparatus according to claim 1, in which the compressor for the cold-producing fluid has a plurality of intake stages in which there are a plurality of vapourisers in communication, respectively, with the said intake stages and assuring the circulation in parallel of cold-producing fluid, and in which the network for the intermediary fluid comprises a plurality of parallel circuits co-ordinated respectively with the said vapourisers in a heat exchange relationship.

3. Apparatus according to claim 2, in which the parallel circuits comprise tanks containing the corresponding vapourisers immersed in the intermediary fluid.

4. Apparatus according to claim 2, in which the intermediary fluid circuits have corresponding nests of tubes arranged in such manner as to be swept successively by a flow of working fluid.

5. Apparatus according to claim 2, in which the means for heat exchange between the intermediary fluid and the working fluid allow for heat exchange by direct contact between the fluids.

6. Thermodynamic apparatus comprising a compressor for working fluid, a refrigerating machine for cooling the working fluid prior to its infeed into the compressor therefor, and having a compressor for cold-producing fluid, a network for circulation of intermediary fluid, and means for performing a heat exchange between the intermediary fluid and the cold-producing fluid on the one hand and between the intermediary fluid and the working fluid on the other hand, said means for heat exchange between the intermediary fluid and the working fluid allowing for heat exchange by direct contact between the fluids, the direct contact heat exchange means comprising at least one perforated plate on which the intermediary fluid flows horizontally whilst forming a sheet traversed by the working fluid.

7. Apparatus according to claim 6, including a cowling arranged to duct the working fluid to the compressor of the gas cycle and forming a closure for the sheet of intermediary fluid.

8. Apparatus according to claim 6, including a plurality of the said perforated plates carrying sheets of intermediary fluid positioned one above each other, which sheets are traversed successively by the working fluid.

9. Apparatus according to claim 8, in which the sheets are supplied from corresponding tanks situated at the same level, through feed pipes, of which each has an open vessel and a constricting valve positively controlled by the level of liquid in the said vessel.

10. Apparatus according to claim 5, including a filter for collecting the impurities left behind by the working fluid in the intermediary fluid.

11. Apparatus according to claim 1, in which the means of heat exchange between the intermediary fluid and the working fluid allow for heat exchange by direct contact between the fluids.

12. Plant for producing mechanical power comprising a gas turbine including a combustion chamber, a compressor for compressing a working fluid and supplying it to the gas turbine through the combustion chamber, a refrigerating machine including compressing means driven by mechanical power for operating the refrigerating machine and for circulating a cold-producing fluid therethrough, a network for circulating an intermediary fluid, means for performing a heat exchange between the intermediary fluid and the cold-producing fluid and means for performing a heat exchange between the intermediary fluid and the working fluid prior to the infeed thereof into the compressor therefor.

13. Apparatus according to claim 12, in which said turbine and said refrigerating machine are in mechanically interconnected relation.

References Cited

UNITED STATES PATENTS

| 1,884,534 | 10/1932 | Betz | 62—310 |
| 2,479,732 | 8/1949 | Dodson | 62—510 |
| 3,338,566 | 8/1967 | Kittle | 261—113 |

MEYER PERLIN, Primary Examiner

U.S. Cl. X.R.

62—402, 510